July 2, 1957 L. GEBHART ET AL 2,797,478
GRAPEFRUIT-ORANGE SEGMENT KNIFE
Filed June 7, 1956 2 Sheets-Sheet 1
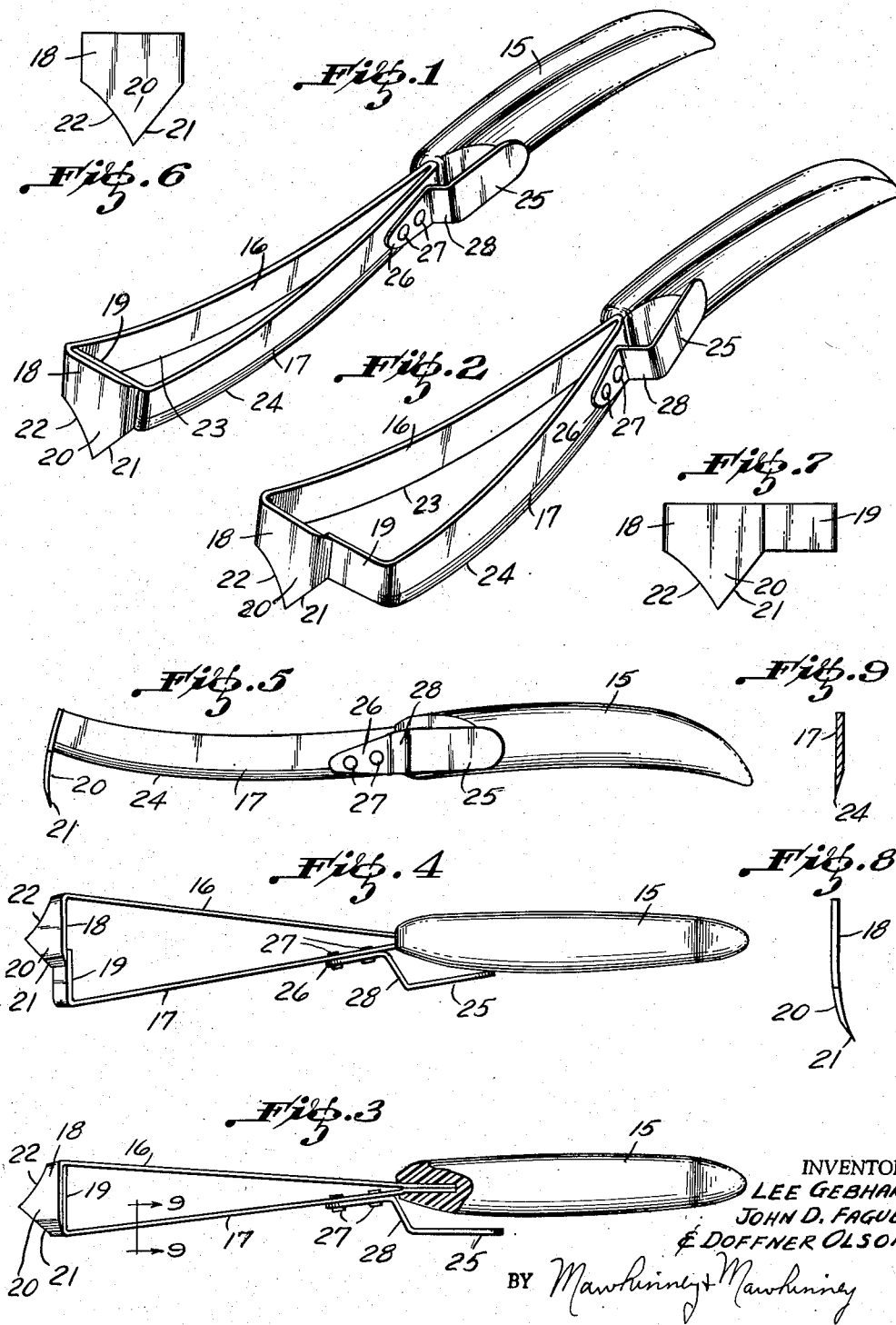
INVENTORS
LEE GEBHART,
JOHN D. FAGUE
& DOFFNER OLSON
BY Mawhinney & Mawhinney
ATTORNEYS July 2, 1957 L. GEBHART ET AL 2,797,478
GRAPEFRUIT-ORANGE SEGMENT KNIFE
Filed June 7, 1956 2 Sheets-Sheet 2
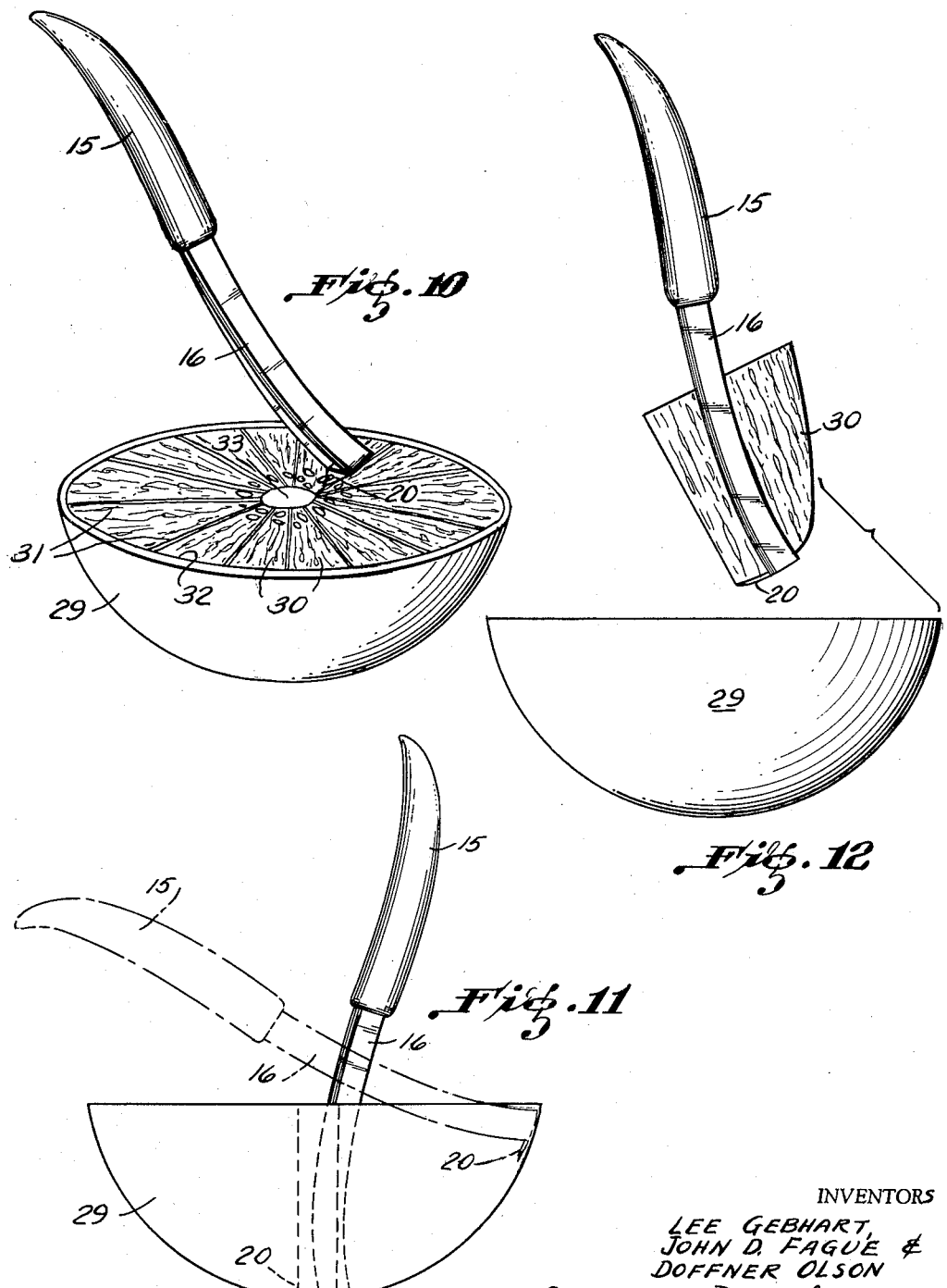
INVENTORS
LEE GEBHART,
JOHN D. FAGUE &
DOFFNER OLSON
BY Mawhinney & Mawhinney
ATTORNEYS

United States Patent Office 2,797,478
Patented July 2, 1957

2,797,478
GRAPEFRUIT-ORANGE SEGMENT KNIFE
Lee Gebhart, Coral Gables, John D. Fague and Doffner Olson, Miami, Fla.; said Fague and said Olson assignors to said Gebhart Application June 7, 1956, Serial No. 590,061
10 Claims. (Cl. 30—24)

The present invention relates to grapefruit-orange segment knife and more particularly refers to a knife or cutter adapted to expeditiously and quickly cut out segments of the meat from halved citrus fruit.

Another object of the invention is to provide a grapefruit-orange segment knife constructed and arranged to operate upon a new mode of procedure for severing simultaneously the side and end walls of the segments of fruit between the diaphragms or webs which extend radially about the fruit from the core to the rind thereof and which separate the wedge-shaped segments of the meat.

A further object of the invention resides in providing an improved knife provided with both longitudinal and transverse blades or cutters adapted, in one pass of the knife through the fruit, to sever the sides and ends of the segments of meat all along the diaphragms or webs and along the rind outwardly of the meat segment down to and including the narrowest portion of the meat segment adjacent the core but without disturbing the core and without involving the necessity of removing the core from the fruit either before or after the cutting operation.

The invention has for a still further object to provide a grapefruit-orange segment knife of such an adjustable character that it might be widened or narrowed by the simple act of gripping the handle of the same to accommodate the knife to varying widths of the meat segments in citrus fruits of various sizes to the end that at least one laterally movable blade of a blade couple may be adjusted toward and from the other blade to cut out, without waste, the entire circumferential body of the meat segment with the knife blades cutting close to the separator diaphragms or webs.

A still further object of the invention is to provide a knife of the character above indicated which is susceptible of a deft and nice adjustment so that the whole of a meat segment may be cut out from the fruit without encroaching upon the diaphragms, rind or core which parts are generally regarded as inedible and which secrete oils which are bitter to the human taste and therefore an undesirable addition to the wholesome meat slices or segments.

Other objects of the invention are to provide, in a knife of the character above described, curvilinear and sharpened blades in a relative order which contribute to the ease and celerity with which the implement may be wielded in performing the cutting operation, the tool also involving a carrier element by which the meat segment, on the completion of the severing operation, may be lifted out from the fruit, the knife in its final position after the cutting operation presenting such element to the lower portion of the segment whereby the segment may be easily lifted out and free of the fruit.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is a perspective view of a grapefruit-orange segment knife constructed in accordance with the present invention and shown in the narrowed or collapsed normal position in readiness for cutting a segment of meat of a minimum width.

Figure 2 is a similar view showing the implement widened to its greatest capacity for cutting a segment of maximum width.

Figure 3 is a top plan view of the implement in the narrowed position.

Figure 4 is a top plan view of the same in the wide open position.

Figure 5 is a side elevational view of the improved knife.

Figure 6 is an end view of the knife taken from the transverse cutter end and in the narrowed condition.

Figure 7 is a similar view showing the parts in the spread or widened condition.

Figure 8 is an enlarged edge view of the transverse knife blade.

Figure 9 is a cross-sectional view taken through one of the knife blades on the line 9—9 of Figure 3.

Figure 10 is a perspective view showing a grapefruit half with the improved implement poised thereabove in position to remove seeds.

Figure 11 shows in dotted lines substantially the initial position of the implement and in full lines the final position of such implement after having been moved through the grapefruit through an angle of substantially ninety degrees to complete the severing operation.

Figure 12 is an exploded side elevational view of the grapefruit and improved implement, illustrating the function of the latter as a carrier for the severed meat segment.

Referring more particularly to the drawings, 15 designates a handle and 16 and 17 longitudinal blades affixed at one end to the handle. The blades are preferably of resilient stainless steel and they diverge outwardly from the handle so as to assume the general form of a segment of citrus fruit meat.

At their outer ends the blades are provided with mutually inturned flanges 18 and 19, the same being lapped but otherwise free of one another although they are preferably in contact and are capable of sliding laterally with respect to the longitudinal dimensions of the blades 16 and 17 by which they are carried.

One of the flanges, for instance the flange 18, has preferably integral therewith a triangular blade 20 offset downwardly therefrom in the positions of Figures 1 and 2. This triangular blade 20 has an inclined cutting edge 21 and an inclined or incurved cutting edge 22. The cutting edges 21 and 22 converge downwardly to a substantial point. The lower edge of the flange 19 may also be sharpened or beveled to provide a cutting edge. The longitudinal blades 16 and 17 are provided with the cutting edges 23 and 24, shown in Figure 9, such cutting edges being beveled in the direction from the outsides of the blades inwardly.

The cutting edges 23 and 24 constitute longitudinal cutters and the cutting edges 21, 22 constitute the transverse cutters as does also the lower edge of the inturned flange 19.

At least one of the blades, for instance the longitudinal blade 17, carries a thumb-piece 25 having a shank 26 by which the same may be affixed, as by rivets 27 to the side of the blade 17 near the handle 15. An off-set section 28 between the thumb-piece 25 and the shank 26 permits the thumb-piece 25 to normally stand off substantially parallel to the handle 15 in a position where it will be natural for the thumb to engage the part 25 when the fingers of the hand of the operator envelop the handle 15.

Referring more particularly to Figures 10, 11 and 12, a half-citrus fruit 29 is illustrated as having the meat segments 30 between the diaphragms or webs 31 which radiate from the core 33 outwardly to the rind or outer wall 32.

In the use of the improved implement, a grapefruit, orange or other citrus fruit may be cut in half crosswise of the core 33 and meat segments 30. If the fruit contains seeds, the point of the triangular blade 20 may be employed to remove such seeds. The act of removing the seeds is illustrated in Figure 10.

It is not necessary to remove the center core 33 and in fact it is undesirable to do so as the core tends to hold the webs 31 and the segments 30 in place so that the cutting operation may be performed more expeditiously. The narrow position of the implement, as shown in Figures 1 and 3, may be used for oranges or for fruit having small sections or segments while a wider adjustment, such as shown in Figures 2 and 4, is employed for grapefruit.

To initiate the operation, as shown in Figure 11, the point of the triangular blade 20 is placed between the meat 30 and the white outer wall 32 of the rind. The handle 15 and longitudinal blades are made to assume initially a substantially horizontal position as shown in Figure 11 with the implement extending substantially diametrically across the grapefruit. In this initial position the cutting edges 23 and 24 of the longitudinal blades 16 and 17 and the cutting edges 21 and 22 and the cutting edge of the flange 19 are pressed downwardly inside the two webs 31 which border on the meat segment 30 to be severed. The point 20 is made to follow the contour between the outer white wall 32 and the meat 30. In other words, the implement is moved from the dotted to the full line position of Figure 11 in executing the full cutting stroke. The initial position is one substantially horizontal and the final position is one in which the handle 15 and the longitudinal knife blades 16 and 17 are substantially vertical with the longitudinal cutting edges 23, 24 coming up substantially against the core 33 so that the entire side walls of the meat segment 30 have been cut from the two webs 31 to which it was attached.

Figure 12 shows that in this final vertical position of the tool the flanges 18, 19 are directly beneath the severed segment 30 and the same constitute a carrying element by which the segment 30 may be lifted from the fruit and carried to a plate or other desired destination.

It will therefore be seen that as the cutters are pressed down along the webs with the point of the cutter following the contour of the outer white wall, the handle comes up to a vertical position, bringing the longitudinal and transverse cutters between the meat of the segment 30 and the webs 31 all the way to the center core 33. If the section or segment of meat 30 is to be left in the fruit, the knife is simply backed out. If the meat is to be removed, the handle 15 may be twisted slightly, thus binding the meat 30 between the longitudinal blades and thereupon the implement is lifted upwards and the meat will come out of the fruit with the knife.

Now it will be understood that the blade 16 may be rigid if desired, it being only necessary that the companion longitudinal blade 17 be flexible and resilient, in which case it is only necessary to provide one thumb-piece 25 affixed to the single resilient blade 17. This resilient blade is so mounted in the handle 15 that it is given a bias to the closed position of Figures 1 and 3, sliding the flanges 18 and 19 into completely overlapping relation and shifting the thumb-piece 25 outwardly into spaced relation with the handle 15. In other words, the inherent resiliency of the blade 17 will cause it to seek the narrowed or collapsed position of Figures 1 and 3, and it will require the pressure of the thumb or finger on the piece 25 to swing or pivot the blade 17 to an outwardly greater angular position to enlarge the enclosed triangular space between blades 16, 17, 18, and 19 as required to straddle a segment of grapefruit of larger width and dimensions.

It will also be understood that when gripping the handle 15 in the right hand, the thumb will be in a natural position to grasp the thumb-piece 25 while the cutting edges 23, 24 and 21, 22 are disposed downwardly.

As shown more particularly in Figure 5, the blades 16 and 17 may also be given a curvature in a longitudinal direction in which the lower longitudinal cutting edges 23 and 24 are on a convex curve. This will facilitate the penetration of the blade into the fruit.

It will be appreciated that the implement maintains a constant V shape, whether open or constricted, to conform exactly to the shape of a segment from a grapefruit or orange, and this is important if one is to make a clean cut and get the entire segment out at one move or stroke.

Also it will be noted that the longitudinal knife blades have cutting edges 23, 24 that are ground from the outside inwardly. This allows, with a proper pressure, the edges to slip easily along the walls of the separating membrane or webbing without cutting them and mangling the segment or the one adjoining and allowing for a perfectly clean cut resulting in a complete segment.

The cutting stroke may be characterized as a substantially arcuate movement through an angle of substantially ninety degrees in which the axis of the movement is substantially adjacent the upper end of the core 33, so that the handle 15 comes forwardly and upwardly to an upright position as the transverse cutters 19 and 20 descend and move through a substantially arcuate path to the base of the core 33. Of course, grapefruit is rarely truly spherical. The same are generally characterized by a certain oblateness but they are spheroidal. Any departures from the true sphere are not important as the implement is not fixed to the fruit at any point but the cutting edges 23 and 24 of the longitudinal blades may be moved back and forth toward and away from the core and up and down as the tool approaches the final movement of its stroke. In this way the transverse cutters 19 and 20 may be kept close to the rind to achieve an accurate cut between the rind and the meat. Moreover, the convexity of the cutting edges 23, 24 enables a cut to be performed in the act of executing the angular stroke of the implement.

The blade 16 may be made substantially rigid and the entire adjusting movement may be accomplished by shifting the companion blade 17 toward and from the blade 16 by the manipulation of the thumb-piece 25. In this way adjustment of a single member only is required so that the adjustment may be more perfectly performed with less liability to inaccuracy, and moreover it is easier to maintain the spacing between the blades 16 and 17 throughout the entire cutting stroke, this being advantageous over prior forms of implements in which the thumb and forefinger are employed simultaneously on the outside surfaces of a pair of flexible blades in order to move the same together, such blades being spring biased to an outwardly spread maximum position.

According to the present invention the blades 16, 17 by reason of the potential energy inherent in the spring biased blade 17, tend to always seek a relative position in which these blades 16, 17 approach one another to the minimum angular relationship, and the adjustment is accomplished by prying the movable blade 17 outwardly away from the companion fixed blade 16 so that the angle subtended by the two blades is increased to a greater value, and this value may be throughout a relatively wide range as will be clear from a comparison of Figures 1 and 2. Incident to this widening movement between the blades 16 and 17, the flanges 18 and 19 will slide upon one another and thus tend to stabilize the blades at their outer unsupported ends. These flanges 18 and 19 may also form stops to restrict the inward movement of the blade 17 as indicated in Figure 1.

Thus adjustability is had not only relatively between the two blades 16 and 17, but also between the flanges 18 and 19 and the cutting edges thereof. This makes for a completely clean cut of a complete segment on both sides down to the core and also on the outer edge of the segment between the segment and the rind, and this without regard to the relatively spread condition of the longitudinal blades so that the same clean cut may be had from fruit segments of any sizes.

The edges 23 and 24 are ground inwardly which assures no gripping or tearing of the skin wall of the fruit as the knife is brought from the outside toward the center core. Again, this arrangement contributes to a cleaner cut and a more complete segment.

As the flanges 18, 19 are brought downwardly and inwardly toward the core, the same exert a tendency to expand the narrowing segment walls, especially with the inwardly ground cutting edges, so that not only is the webbing not torn but it is forced open all the way up to the core to effect a cleaner release and a fuller release.

With the improved knife, the forward cutting edges 23, 24 as well as the cutting edges appendant to the inturned lapped flanges 18, 19 are all brought back to the core, as shown in full lines in Figure 11; then a slight upward turn cuts this inner portion of the segment from the core, again leaving it whole and completely free.

The flanges 18, 19 as well as the triangular blade 20, in their lapped positions, are enabled to pick up the whole released segment and take it out of the fruit shell. This is possible because the present implement presents a closed triangle rather than just an open V and provides in effect a casing or gripping surface around the released segment whereby this lifting can be accomplished. Or, conversely, if it is desired to simply release the segment, a slight forward inclination of the triangular shaped knife 20 simply drops it back into the segment compartment.

Accordingly, it will be understood that with one swift movement of the implement a whole segment may be removed cleanly and by substantially the same movement lifted and removed from the shell of the fruit. The segment is removed in a full and completely undamaged condition without tearing either webbing walls, skin or core of the shell.

Although we have disclosed herein the best form of the invention known to us at this time, we reserve the right to all such modifications and changes as may come within the scope of the following claims.

What is claimed is:

1. A grapefruit-orange segment knife comprising a handle, relatively movable blades attached at one end to the handle, said blades having inturned lapped flanges on their outer free end to form a closed adjustable segment with the movable blades, and means for angularly adjusting the blades and for correspondingly shifting said flanges to adjust the circumscribed area of the segment within the blades and flanges.

2. A grapefruit-orange segment knife comprising a handle, a pair of blades secured at one end to the handle and diverging outwardly therefrom, said blades having inturned lapped flanges at their outer free ends forming with the blades a closed segmental area, at least one of the blades and its flange being movable laterally with respect to the companion blade and flange to increase or decrease the included area between the blades and flanges.

3. A grapefruit-orange segment knife comprising a handle, longitudinal blades affixed at their inner ends substantially together in the handle and having inturned lapped flanges at their outer ends, said blades diverging outwardly from the handle and having longitudinally extending cutting edges ground from the outside inwardly, said flanges also having ground cutting edges, at least one of said blades and its flange being flexible so as to be movable laterally relatively to the other blade and its flange, and means for adjusting the movable blade with respect to its companion blade to vary the included segmental area between the blades and flanges.

4. A grapefruit-orange segment knife comprising a handle, a fixed blade secured at one end to the handle and having an inturned flange at its outer end, a movable companion blade secured to the handle in close proximity to the handle-attached end of the fixed blade and diverging outwardly from the fixed blade and having an inturned flange movably lapped with the flange of the fixed blade, and means attached to the movable blade and extending at least partially alongside the handle for moving the movable blade and its flange laterally with respect to the fixed blade and its flange.

5. A grapefruit-orange segment knife comprising a pair of blades associated together in substantially the V formation and having lapped relatively movable flanges at their wider ends, a handle affixed to the inner adjacent ends of the blades, and means associated with the handle for moving at least one blade and its flange relatively to to the other blade and its flange to adjust the included segmental area between the blades and their flanges.

6. A grapefruit-orange segment knife comprising a pair of blades associated in substantially V formation and having inturned lapped flanges at their outer ends, a handle to which the blades are affixed at their near ends, cutting edges along the lower edges of the blades and flanges, the cutting edges of the blades being substantially convex, and means for adjusting the relative lateral positions of the blades and their flanges to increase or decrease the included segmental area within the blades and their flanges.

7. A grapefruit-orange segment knife comprising a pair of laterally relatively adjustable blades associated in substantially V formation and having inturned lapped movable flanges at their divergent ends, a handle for carrying the blades at their convergent ends, the outer most flange having a dependent substantially V-shaped transverse cutting blade.

8. A grapefruit-orange segment knife comprising a pair of blades associated in substantially V formation having inturned lapped relatively slidable flanges, a substantially triangular transverse cutting blade depending from the outer most flange and having downwardly convergent substantially inclined cutting edges coming to a substantial point at their lower meeting edges, and means for carrying said blades at their convergent ends.

9. A grapefruit-orange segment knife comprising a pair of blades of stainless spring steel associated together in substantially V formation with relatively inturned lapped relatively slidable flanges at their divergent ends, a substantially triangular transverse cutting blade depending from the outer most flange, said triangular blade having an inclined and incurved cutting edges converging downwardly to a substantial point, a handle for connecting the convergent ends of the blades, one at least of the blades having means for shifting the same outwardly laterally away from the other blade to vary the included segmental area within the blades and their flanges, the blades being spring biased to a narrowest position.

10. A grapefruit-orange segment knife comprising a handle, V related blades affixed at their convergent ends to the handle and having their divergent ends inturned relatively lapped and slidable flanges, both blades and flanges having cutting edges at their portions, one at least of the blades being resilient and spring biased to a closed position in which its flange at its free edge engages as a stop against the companion blade, and a thumb-piece carried by the movable blade near the handle and extending substantially parallel with the handle in the closed position of the spring blade, said thumb-piece having a shank affixed to the spring blade, said thumb-piece having an off-set between the shank and the thumb engaging portion.

No references cited.